United States Patent [19]

Paeye

[11] Patent Number: 4,739,631
[45] Date of Patent: Apr. 26, 1988

[54] ADSORPTION-DESORPTION THERMIC MACHINE

[75] Inventor: Gerard F. Paeye, Carquefou, France

[73] Assignee: Jeumont-Schneider Corporation, Puteaux cedex, France

[21] Appl. No.: 888,847

[22] Filed: Jul. 22, 1986

[30] Foreign Application Priority Data

Jul. 30, 1985 [FR] France .................. 85 11587

[51] Int. Cl.$^4$ .................................... F25B 17/02
[52] U.S. Cl. ...................... 62/478; 62/119; 62/480
[58] Field of Search .............. 62/480, 478, 106, 119, 62/260, 514 R

[56] References Cited

U.S. PATENT DOCUMENTS

| | | | |
|---|---|---|---|
| 1,564,705 | 12/1925 | Odell et al. | 62/478 X |
| 1,960,824 | 5/1934 | Munters | 62/106 |
| 4,205,531 | 6/1980 | Brunberg et al. | 62/106 X |
| 4,368,623 | 1/1983 | Knoche et al. | 62/478 X |
| 4,581,049 | 4/1986 | Januschkowetz | 62/478 X |

FOREIGN PATENT DOCUMENTS 0124455 11/1984 European Pat. Off. .

Primary Examiner—Lloyd L. King
Attorney, Agent, or Firm—Rines and Rines, Shapiro and Shapiro

[57] ABSTRACT

The invention concerns a thermic machine comprising a reactor of the adsorption-desorption type, a condenser and an evaporator. According to the invention, the machine is constituted by a first vertical hermetic cylindrical tank section (1), traversed by a first hydraulic circuit (4) and containing the reactor, an envelope arranged at the periphery of the first tank section (1), which is connected to a second hydraulic circuit (6) and which together with the wall of the said first tank section (1) constitutes the condenser (5), and a second hermetic tank section (2) in communication with and arranged below tank section (1), the second tank section being traversed by a third hydraulic circuit (7) and constituting the evaporator.

6 Claims, 1 Drawing Sheet

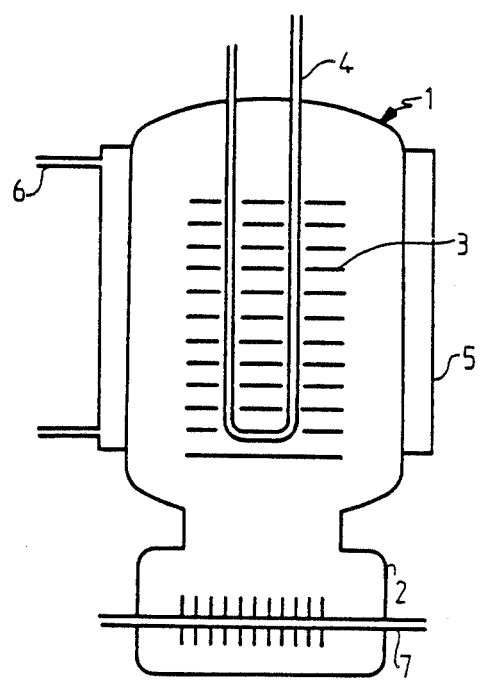

ADSORPTION-DESORPTION THERMIC MACHINE

The present invention concerns a thermic machine comprising a reactor of the adsorption-desorption type, a condenser and an evaporator.

Such machines are utilized especially in the field of refrigeration.

European Pat. No. EP.A-0 124 455, for example, describes a thermodynamic apparatus making use of two thermic machines of this type, to produce cold from a heat source, in semi-continuous fashion. These thermic machines are of a compact form each being composed of a horizontal uniblock cylindrical tank under vacuum and having at its periphery the reactor itself. As its center, the tank has a unit in the form of plates, which according to the operating cycle, alternately constitutes the evaporator and the condenser of the system.

So compact a form is entirely desirable in order to eliminate the need for valves under vacuum, the cost and added complexity of which are prohibitive. Nevertheless, the thermic machine described in the above-cited patent presents certain drawbacks which reduce its thermic yield. For example, there is a loss of heat at each reversal of the cycle, when the central unit changes from the evaporator state to the condensor state or vice-versa. Moreover, because the reactor is positioned in the peripheral region of the tank, parasitic condensation occurs on the tank walls at the start of each half-cycle. Also, the central unit, because of its two distinct functions, cannot be optimized for one function or the other, but must be the result of a compromise.

The present invention has as its goal to obviate these drawbacks, while preserving the desirable compact form of such a machine.

According to the invention, the thermic machine comprising an adsorption-desorption reactor, a condenser and an evaporator, is constituted by first and second tank sections which are in communication with one another and hermetically sealed. The first tank section is traversed by a first hydraulic circuit and contains the reactor. An envelope at the periphery of the first tank section constitutes with the wall of the first tank section the condenser, which is connected to a second hydraulic. The second tank section arranged below the first tank and is traversed by a third hydraulic circuit, the second tank section constituting the evaporator.

The invention will be better understood, and other goals, advantages and characteristics of the invention will appear more clearly through a reading of the following description of the preferred embodiment, given as a non-limiting example, to which is appended one drawing.

The single FIGURE represents schematically a thermic machine conforming to the present invention.

Referring to the drawing, the thermic machine is constituted by a first hermetic vertical cylindrical tank section 1, linked to a second tank section 2, positioned below the first tank section. Within these two tank section, a relatively high vacuum is maintained.

Horizontal plates 3 are arranged parallel to one another at the center of the first tank section 1 to carry the adsorbent-desorbent material, such as zeolite. They are traversed by a first hydraulic circuit 4, intended to carry heat to or from the zeolite, according to the operating cycle. At the periphery of the first tank section is placed an envelope 5 which, with the wall of the first tank section 1, constitutes the condenser. This condenser is also connected to a hydraulic circuit 6, enabling the recovery of heat when the zeolite is heated during one half-cycle, or the removal of heat by way of the circuit during the other half-cycle of the operation of the machine.

The second tank section 2 is situated below the first tank section 1, in such a way that the condensates which form on the wall of the first tank section 1 during the heating of the zeolite fall by gravity into the second tank section 2. Tank section 2 constitutes the evaporator of the system,, and a hydraulic circuit 7 traverses the second tank section to recover the cold produced during the corresponding half-cycle.

It is thus found that because the evaporator and condenser are physically separated, it is possible to optimize each one, in dimension and form in particular, for its own function.

The compact form of the thermic machine is thus preserved while at the same time avoiding the need for valves under vacuum. The valves enabling alternating control of operation may be all arranged on secondary circuits in which there is no pressure constraint.

Although only one mode of embodiment has been described, it is obvious that various modifications may be made that will not constitute a departure from the framework of the present invention.

I claim:

1. An adsorption-desorption type thermic machine for providing refrigeration, comprising a first tank section and a second tank section open internally to one another and hermetically sealed, said first and second tank sections being internally under vacuum and said second tank section being disposed below said first tank section, means disposed within said first tank section for supporting adsorptive-desorptive material generally centrally within said first tank section, envelope means disposed at the periphery of said first tank section and together with the periphery of said first tank section defining a condenser, means disposed within said first tank section for transferring heat to and from said adsorptive-desorptive material, and means coupled to said second tank section for drawing cooling therefrom.

2. A thermic machine according to claim 1, wherein said supporting means comprises a plurality of plates.

3. A thermic machine according to claim 1, wherein said heat transferring means comprises a hydraulic circuit traversing said plates.

4. A thermic machine according to claim 1, wherein said envelope means surrounds said first tank section.

5. A thermic machine according to claim 1, wherein said means for drawing cooling comprises a hydraulic circuit internally traversing said second tank section.

6. A thermic machine comprising a first tank section, a second tank section situated below said first tank section, said first and second tank sections being hermetically sealed but internally open to one another, adsorption-desorption reactor means disposed generally centrally within said first tank section, first hydraulic circuit means traversing said first tank section for transferring heat to and from said reactor means, and means disposed at the periphery of said first tank section and defining therewith a condenser, said condenser having connections to second hydraulic circuit means, said second tank section being traversed by third hydraulic circuit means and constituting an evaporator.

* * * * *